United States Patent Office 3,220,964
Patented Nov. 30, 1965

3,220,964
NATURAL AND SYNTHETIC RUBBER VULCANIZED WITH A BISPHENOL RESIN AND A METAL HALIDE
Arnold A. Giller, Wiesbaden, Germany, assignor to Chemische Werke Albert, Wiesbaden-Biebrich, Germany, a corporation of Germany
No Drawing. Filed Nov. 24, 1961, Ser. No. 154,825
21 Claims. (Cl. 260—19)

This invention relates to a vulcanization process, and more particularly to a method of vulcanizing natural and synthetic rubber with so-called bisphenol resins in the presence of metal halides as vulcanization accelerators.

Various methods have previously been described whereby natural rubber or synthetic elastomers may be vulcanized by the action of phenol resins. The term "phenol resins" in this sense is usually understood to designate those resin products which are obtained by alkaline condensation of substituted phenols, preferably by p-alkyl-substituted phenols, with formaldehyde. Such condensation products are hereinafter referred to as "alkylphenol resins." However, the expression "phenol resins" also includes those resins which are obtained by alkaline condensation of bicyclic phenols, such as bisphenol and especially p,p'-dihydroxy-diphenylpropane, with formaldehyde and either simultaneous or subsequent etherification of the polymethylol compound formed thereby with monoalcohols. They are, as a rule, diluted with an inert solvent prior to their use as vulcanizing agents. For the sake of simplicity, such ethers of bicyclic phenolformaldehyde condensation products are hereinafter referred to as "bisphenol resins."

These known vulcanization processes with phenol resins have, however, not found their way into actual practice, either because the effects produced thereby are not uniformly satisfactory or because the processes themselves are difficult to perform on an industrial scale.

For example, French Patent 861,306 discloses that natural rubber or synthetic butadiene-acrylonitrile rubber can be vulcanized with bisphenol resins as well as with alkylphenol resins, and that the vulcanizing effect produced thereby can be enhanced by the addition of metal oxides and/or carbon black. However, this process has not acquired any practical importance because the vulcanizates obtained thereby exhibited inadequate technical properties, even if large quantities of the alkylphenol resins and long vulcanization periods were used.

United States Patents 2,649,431 and 2,649,432 describe the vulcanization of synthetic rubber of the GRS type (Buna S) with small amounts of alkylphenol resins, but these prior art patents point out that this vulcanization process produces satisfactory results only if certain materials which accelerate the vulcanization, such as p-formaldehyde or triethanolamine, are concurrently employed.

Finally, Austrian Patents 162,570 and 165,035 disclose that styrene-butadiene copolymers can be vulcanized with the aid of trivalent phenols, such as pyrogallol or phloroglucin, and that this vulcanization process can be accelerated by adding aromatic amines, such as aniline and o- or p-nitroso-dimethylaniline, or small amounts of a metal chloride, such as stannic chloride, ferric chloride and aluminum chloride, to the vulcanization mixture. However, this method has also failed to produce entirely satisfactory results and has therefore not attained any substantial practical value.

Thus, all indications from previous experience pointed toward the fact that vulcanizing agents of the phenol series do not produce satisfactory results even if vulcanizing assistants of various types are added to the vulcanization mixture or the vulcanizing time is increased.

This application is a continuation-in-part of my copending applications Serial No. 862,462, filed December 29, 1959, now abandoned; Serial No. 37,111, filed June 20, 1960; Serial No. 140,637, filed September 19, 1961, and Serial No. 154,826, filed November 24, 1961.

I have now surprisingly discovered that natural or synthetic rubber such as the afore-mentioned rubber types may be vulcanized with good results if there is used (1) as vulcanizing agent a diphenol resin obtained by condensation of a binuclear diphenol with formaldehyde under alkaline conditions and etherification of the resulting polymethylol condensate with a monohydric alcohol and (2) as vulcanization accelerator a halide of a metal of group IIa, IIb, IIIa or IIIb of the periodic table or of a heavy metal and the resulting mixture is heated until it is vulcanized.

According to a preferred embodiment of the invention the metal halides are produced in situ in the vulcanization mixture, prior to addition of the diphenol resin thereto, by reaction of a halogen donor with a compound of a metal of group IIa, IIb, IIIa or IIIb of the periodic table or a compound of a heavy metal.

Vulcanizates produced according to the invention are characterized by good physical properties. Vulcanizates of compositions in which the metal halide has been produced in situ are distinguished from vulcanizates of compositions to which the metal halide has been added per se, by an improved elongation. This improvement is particularly distinct in the case of aged vulcanizates. Also, the plasticity of the vulcanizable mixtures which contain the halogen donor and the metal compound is lower, i.e. better than that of vulcanizable mixtures to which the metal halides have been added per se. Furthermore, the vulcanizable mixtures of this preferred embodiment do not show any tendency to vulcanize during processing prior to vulcanization, e.g. during the compounding procedure or when extruding the vulcanizable mixture, so that scorching and serious disadvantages which may be caused thereby are completely avoided. Finally, substantially no corrosion of metallic parts of any apparatus with which the hot mixture to be vulcanized is contacted occurs when the metal halide is produced in situ.

In the following specification, the parts and percentages referred to are by weight unless otherwise stated. The heavy metals referred to are those having a specific gravity of greater than 4.

The term "halogen-donor" is used for organic compounds from which halogen or hydrogen halide may be split off at elevated temperatures in the presence of the metal compound. The reaction between the halogen donor and the metal compound is generally effected at a temperature between 70 and 250° C., preferably at a temperature between 120 and 230° C., advantageously at a temperature between 160 and 210° C.

If the rubber mixtures are compounded on roll mills it is preferable for economic reasons to carry out the heat treatment for not more than 15 minutes. When storing or annealing the mixture at a temperature in the above range, there is no such time limitation and accordingly it may be heated for a longer time, such as 30 to 90 minutes. During this heat-treatment not only is the metal halide formed but the vulcanization rate is increased and the vulcanization improved.

The reaction of the halogen-donor and the metal compound may also be carried out by mixing some or all of the ingredients of the mixture to be vulcanized (except of course the di-phenol resin), for example in an internal mixer such as a Banbury mixer, at a temperature above 70° C. In this procedure it is not necessary to conduct the whole mixing procedure at a temperature above 70° C. it being sufficient to keep the mixture at such a temperature only for a period sufficient to allow reaction between the metal compound and the halogen-donor.

The formation of the metal halide in the elastomer may also be accomplished in part at the normal compounding temperature and finished during the vulcanization reaction. By appropriate selection of the metal compound and the halogen donor and the compounding temperature, the amount of metal halide formed in situ in the elastomer may be varied within wide limits.

The diphenol resin may be added to the prepared mixture either in the hot or in the cold and incorporated into it either immediately or in a separate stage in a mixing device such as a roll mill.

The process according to the invention is suitable for the vulcanization of elastomers, natural or synthetic which contain olefinic bonds. Suitable synthetic rubbers include, for example, butyl rubber, copolymers of butadiene and/or isoprene with acrylonitrile or styrene, polybutadiene, polyisoprene in which the isoprene component is predominantly contained in the 1,4-cis-position or in the 1,4-transposition, or polychloroprene. The term "butyl rubber" is generally used to denote synthetic copolymers of an isoolefin, such as ethylmethylethylene or more usually isobutylene, with a minor proportion of a poly-unsaturated olefinic compound having from 4 to 14 carbon atoms per molecule. The isoolefins used generally have from 4 to 7 carbon atoms. The poly-unsaturated olefinic compound is usually an aliphatic conjugated di-olefin having from 4 to 6 carbon atoms, and is preferably isoprene or butadiene. The butyl rubber contains only relatively small amounts of the diene component, generally from about 0.5 to 5%, and seldom more than 10%, calculated on the total weight of the elastomer.

Suitable halogen-donors are those compounds from which halogen or halogen halide is split off under the conditions of vulcanization or compounding e.g. at a temperature above 70° C. and in the presence of one of the metal compounds. Halogen-donors include, for example, polymers or copolymers of vinylchloride and/or vinylidene chloride with other polymerizable compounds, preferably those which contain no stabilizing agent; halogen containing elastomers, for example polychloroprene; halogenated for example chlorinated or brominated butyl rubber; halogenation or chlorosulfonation products of high-density or low-density polyethylene or higher poly-olefins; colloidal mixtures of polyvinylchloride with an acrylonitrile-butadiene copolymer; halogenated hydrocarbons containing halogen atoms which may be split off or which may split off hydrogen halide, for example, liquid or solid chlorination products of paraffinic hydrocarbons of natural or synthetic origin; halogenated factice; benzylchloride, benzyldichloride or benzotrichloride or homologues thereof, heptachlorocyclohexane; acid halides, for example lauroyl, oleyl, stearyl or benzoyl chloride; compounds which contain the group >NHal, for example, N-bromosuccinimide or N-bromophthalimide. Bromo-compounds have been found to be particularly effective. Mixtures of two or more of these compounds may also be used.

Suitable metal compounds for use with the halogen-donors include, for example, compounds of magnesium, cadmium, calcium, beryllium, tin, lead, manganese, cobalt, nickel or antimony or preferably zinc, aluminum and iron. The metal compounds may be the oxides or, for example, salts of weak acids such as formic, acetic, lauric, stearic, benzoic, chromic or carbonic acid. The basic salts of these acids or mixtures of several compounds may also be used. Especially good results have been obtained by using zinc oxide together with an iron salt of one of the above-mentioned acids, e.g. stearic acid.

The amount of halogen-donor and metal compound used in the mixture depends on their halogen and metal content respectively and on the ease with which the halogen or hydrogen halide is split off. The amount of these compounds used also depends on the desired degree and conditions of vulcanization. Generally they are used in an amount which leads to the formation of 0.1 to 10, preferably 0.5 to 3.0 parts of metal halide per 100 parts of elastomer. However, smaller or larger amounts of halogen donor or metal compounds may be used, depending on the particular requirements of any vulcanization. The ratio of the metal compound to halogen donor may be varied in wide limits, and the amount of metal compound or halogen donor may exceed that of the other component. For example the metal compound may be added in such an amount that the amount of halogen or hydrogen halide formed by the halogen donor is only sufficient to form a basic metal halide. The favorable ratio of metal compound to halogen donor may readily be determined by simple experiment. For example 3 parts of chlorosulfonated polyethylene with 0.9 to 1.4 parts of zinc oxide or with 5 parts of zinc stearate per 100 parts of the elastomer has been found to give excellent results.

If the metal halides are added per se, e.g. the chlorides or the bromides of the afore-mentioned metals may be used in an amount from 0.1 to 10, preferably from 3 to 5%.

The improved results obtained by the preferred embodiment as compared with those obtained by the addition of metal halide per se, are illustrated in Example 8 hereinafter. The halogen-donor and the metal compound may be used in an amount which leads to the formation of a substantially smaller amount of metal halide than that necessary for attaining substantially the same results if the metal halide is added per se. For example 0.9 to 1.4 parts of zinc oxide and 3.0 parts of chlorosulfonated polyethylene yielding less than 1.7 parts of zinc chloride accelerate the vulcanization better than 3 to 5 parts of metal halide in the prior process.

Suitable diphenol resins for use as vulcanizing agents in the process of the invention are prepared by well-known methods, e.g. by condensing a binuclear diphenol, such as a bis-(hydroxy phenyl)alkane or bis-hydroxy diphenyl with formaldehyde in an alkaline medium and simultaneous or subsequent etherification of the initially formed polymethylol compounds. Suitable diphenols include, for example dihydroxy diphenyl or dihydroxy dibenzyl, alkyl substitution products thereof, dihydroxy diphenyl-methane, or homologues thereof, such as -methyl-methane, -dimethyl-methane, -ethyl-methane, -methylethyl-methane, diethyl-methane, methyl propyl-methane, dipropyl-methane, methyl hexyl-methane, di-hexyl-methane, methyl-cyclohexyl-methane, or products substituted in the phenyl nuclei such as the 3-methyl, 3,5-dimethyl or 3,3'-diisopropyl substitution products. Those compounds containing the 2 hydroxy groups in the p,p'-positions are preferred. The methylol groups of the afore-mentioned polymethylol compounds, generally obtained by reaction of at least 2 and preferably about 4 mols of formaldehyde with the diphenol, are partially etherified with monohydric alcohols such as the methyl, ethyl, propyl, isopropyl, butyl, octyl, isooctyl, dodecyl or benzyl alcohols to such an extent that they are still soluble in organic solvents. Preferably on average at least one, conveniently about 3 methylol groups are etherified. The resins may also be modified i.e. plasticized by heating at a temperature above 70° C. with a hydroxy fatty acid containing more than 10 carbon atoms, or a glyceride thereof. The resin produced is still soluble in organic solvents. The resins may also be plasticized with fatty oils, neutral reacting resins or esters of polyhydric alcohols with a mixture of (A) dicarboxylic acids and (B) fatty or resin acids or mixtures of fatty and resin acids. The production of such plasticized resins is described, for example, in German Patents Nos. 605,917 and 684,225.

The diphenol resins used as vulcanizing agents in the process according to the invention are generally semi-solids, and may conveniently be used in conjunction with varying amounts, e.g. 15 to 50%, of low boiling readily volatilizable solvents such as butanol, benzene, toluene or xylene in the form of viscous liquids. It is more convenient, however, to use the resins in the form of solutions in high-boiling liquid compounds. Such compounds may, for example, be compounds which may be used per se as plasticizers for rubber compositions, for example, mineral oils, aliphatic or aromatic polyethers, esters of polybasic carboxylic acids, polyglycols, polyhydric alcohols or mixtures thereof. The high-boiling compounds may be monomeric or polymeric in nature. The low-boiling solvents may be replaced by the high-boiling compounds by mixing mixtures of the diphenol resins and low-boiling solvents with a suitable amount, e.g. 10 to 50 percent of a high-boiling compound and distilling off the low-boiling compounds in vacuo, preferably at a temperature below 100° C.

The diphenol resins are preferably used in an amount of 1 to 20 parts of resin to 100 parts of the elastomeric component. Larger or smaller amounts, however, may also be used.

The vulcanization is preferably carried out under pressure at a temperature above 100° C., mostly between 110 and 220° C., advantageously at a temperature between 135 and 180° C. Vulcanization, of course, takes more time at a relative low temperature than at a relatively high temperature. For example, it is carried out within 5 to 60 minutes at a temperature between 140 and 160° C. While it is necessary to incorporate into the mixture the diphenol resin at a late stage of the compounding procedure, preferably after the mixture containing the halogen-donor and the metal compound has been heated in order to avoid scorching, the other components of the mixture to be vulcanized may be mixed with each other in any desired order, and by any method customarily used in the rubber industry. It is preferred to incorporate the halogen donor and the metal compound in the elastomer first, in order to ensure a good distribution of metal compound and halogen therein and to ensure that the greatest possible amount of metal halide is formed. The other ingredients, e.g. stearic acid, palmitic acid, myristic or lauric acid or other additives or fillers, such as carbon black or silicon dioxide, may then be added.

The successful use of diphenol resins as vulcanizing agents for rubber compositions according to the present invention is a surprising result. On the basis of their chemical structure, that is the presence of four reactive positions on each diphenol molecule, it could reasonably have been expected that the resins would preferentially or predominantly react with themselves and therefore not produce any or merely an insufficient cross-linking or vulcanization effect. Moreover, it could not have been foreseen that such resins, which contain etherified methylol groups, could be activated by the concurrent use of metal halides to the degree that they could be used to vulcanize rubber compositions therewith.

The use of diphenol resins in combination with metal halides as vulcanizing agents for rubber compositions represents a substantial technical advance in that the vulcanized rubber compositions obtained thereby exhibit a substantially improved resistance against ageing. For example, with the aid of the process according to the present invention it is possible to produce vulcanized butyl rubber compositions which exhibit considerably better physical properties after ageing at 150° C. in a drying chamber with air circulation than the same butyl rubber composition vulcanized with an alkylphenol resin and aged under the same conditions. Moreover, butyl rubber compositions vulcanized in accordance with the present invention exhibit substantially improved elastic properties over butyl rubber compositions vulcanized in accordance with the prior art methods.

The vulcanizates obtained by the process according to the invention have good properties and retain their good properties even when exposed to high temperatures, for long periods of time, i.e. they have good thermal stability. They may be used for example in production of curing bags for new tyres or for retreading tyres, inner tubes, hoses, floor coverings, washers and shock absorbers etc.

The following examples will further illustrate the present invention and enable others skilled in the art to understand it more completely. It will be understood, however, that the invention is not limited to the examples given below.

In these examples the values of the physical properties of the vulcanizates were determined by the pertinent standard DIN (Deutsche Industrie Normen) tests (texts available at Standardization, American Standardization Association, New York, New York 10017), namely as follows:

(a) The tensile strength, ultimate elongation and moduli were determined in accordance with DIN 53504 on standard rings I, 6 mm. thick.

(b) The Shore A hardness was determined in accordance with DIN 53505.

(c) The rebound elasticity was determined in accordance with DIN 53512.

(d) Ageing was carried out in accordance with DIN 53508, paragraph 5.

(e) The method used for obtaining the slit test tear resistance values is not yet standardized, but was carried out on standard ring II with three slits.

EXAMPLE I 1000 gm. of a solution of a plasticized bisphenol resin, prepared from p,p'-dihydroxy-diphenylpropane in accordance with German Patent 605,917 and sold commercially under the mark "Durophen 218V," were admixed with 250 gm. spindle oil, and the resulting mixture was freed from volatile solvent by distillation in a vacuum of 5 mm. Hg at 100° C. 1012 gm. of a solution of the bisphenol resin in spindle oil were thus obtained, and this solution is hereinafter referred to as "Resin A."

Five different vulcanizable rubber compositions I through V were then compounded with butyl rubber (Enjay 365), MPC carbon black, stearic acid, Resin A and $SnCl_2 \cdot 2H_2O$. Each of the compositions contained the same quantity of butyl rubber, carbon black and stearic acid, but the contents of Resin A and $SnCl_2 \cdot 2H_2O$ varied. The following table shows the quantities of ingredients in each of compositions I through V in terms of parts by weight.

Table 1

| Composition | I | II | III | IV | V |
| --- | --- | --- | --- | --- | --- |
| Butyl rubber Enjay 365 [1] | 100.0 | 100.0 | 100.0 | 100.0 | 100.0 |
| MCP carbon black | 60.0 | 60.0 | 60.0 | 60.0 | 60.0 |
| Stearic acid | 1.0 | 1.0 | 1.0 | 1.0 | 1.0 |
| Resin A | 3.0 | 8.0 | 3.0 | 8.0 | 16.0 |
| $SnCl_2 \cdot 2H_2O$ | 3.0 | 3.0 | 5.0 | 5.0 | 2.0 |

[1] Enjay 365 is a non-staining buteneisoprene copolymer having 2.1 to 2.5 mol percent unsaturation.

To compound each of these compositions the butyl rubber (300 gm.) was placed on cooled mixing rolls and was rolled alone for 1 minute. Then the stearic acid, half of the carbon black, Resin A, the remainder of the carbon black and finally the stannous chloride were successively incorporated into the butyl rubber and thoroughly worked in by rolling. Thereafter, the batch was homogenized by periodically cutting the sheet on the roll to bring fresh material through the bite, until a homogeneous uniform, smooth sheet was obtained. Finally, each sheet was divided into three equal parts, which were then vulcanized at 154° C. for 15, 30 and 45 minutes, respectively. The following table shows the physical characteristics of the various vulcanizates obtained thereby:

Table II

| Composition | I | | | II | | | III | | | IV | | | V | | |
|---|---|---|---|---|---|---|---|---|---|---|---|---|---|---|---|
| Vulcanization time (min.) | 15 | 30 | 45 | 15 | 30 | 45 | 15 | 30 | 45 | 15 | 30 | 45 | 15 | 30 | 45 |
| Tensile strength (kg./cm.²) | 72 | 80 | 77 | 113 | 110 | 105 | 78 | 73 | 83 | 118 | 113 | 125 | 79 | 80 | 81 |
| Ultimate elongation (percent) | 460 | 474 | 448 | 384 | 350 | 321 | 385 | 362 | 402 | 272 | 245 | 254 | 322 | 308 | 300 |
| Modulus at 150% elongation (kg./cm.²) | 27 | 27 | 27 | 40 | 42 | 44 | 31 | 31 | 31 | 60 | 65 | 67 | 44 | 46 | 48 |
| Modulus at 300% elongation (kg./cm.²) | 48 | 50 | 52 | 81 | 88 | 94 | 58 | 62 | 63 | | | | 73 | 78 | 79 |
| Tear resistance by slit test (kg./cm.) | 15 | 15 | 15 | 18 | 18 | 16 | 18 | 16 | 17 | 18 | 18 | 18 | 13 | 13 | 13 |
| Hardness Shore A (degree) | 64 | 64 | 64 | 69 | 70 | 70 | 61 | 61 | 61 | 71 | 72 | 72 | 82 | 84 | 85 |
| Rebound elasticity (percent) | 9 | 10 | 9 | 12 | 12 | 12 | 9 | 10 | 9 | 12 | 12 | 12 | 17 | 17 | 18 |
| Specific weight | | 1.124 | | | 1.104 | | | 1.135 | | | 1.128 | | | 1.117 | |

The results tabulated above show that the vulcanization effect may be enhanced by an increase in the amount of resin as well as metal chloride added to the rubber composition. The rebound elasticity also increases with a rising amount of resin, and when the rubber composition contains 8 parts by weight of Resin A the rebound elasticity reaches values which are about twice as high as the rebound elasticity of known vulcanizates; in general, the rebound elasticity of other known butyl rubber vulcanizates is only 5% and at the most 7%. When the rubber composition contains 16 parts of Resin A the rebound elasticity even rises to 17 to 18%. Virtually the same favorable results were obtained when the above butyl rubber compositions were vulcanized at 143° C.

EXAMPLE II

Two more vulcanizable butyl rubber compositions VI and VII were prepared analogous to the preceding example, except that a solution of a non-plasticized bisphenol resin, obtained by partial esterification of still hardenable p,p'-dihydroxy-diphenylpropane-tetramethylol with butanol, in butanol was used. The non-plasticized bisphenol resin employed as the vulcanizing agent in these two compositions is sold commercially under the mark "Durophen 219W" and is hereinafter referred to as "Resin B." The following table shows the ingredients in the two butyl rubber compositions VI and VII, the amounts being given in terms of parts by weight.

Table III

| Composition | VI | VII |
|---|---|---|
| Butyl rubber "Enjay 365" | 100.0 | 100.0 |
| Stearic acid | 1.0 | 1.0 |
| Resin B | 8.0 | 8.0 |
| MPC carbon black | 60.0 | 60.0 |
| SnCl₂·2H₂O | 2.0 | 4.0 |

To prepare the vulcanizable butyl rubber compositions, the butyl rubber was first rolled by itself as in Example I, and then the stearic acid, the resin, the carbon black and finally the stannous chloride were worked in successively until a smooth, homogeneous sheet was obtained. Thereafter, each sheet was divided into two equal parts, which were vulcanized at a temperature of 154° C. for 15 and 30 minutes, respectively. The following table shows the physical characteristics of the various vulcanizates obtained thereby.

Table IV

| Composition | VI | | VII | |
|---|---|---|---|---|
| Vulcanization time (min.) | 15 | 30 | 15 | 30 |
| Tensile strength (kg./cm.²) | 102 | 102 | 111 | 123 |
| Ultimate elongation | 296 | 262 | 191 | 170 |
| Modulus at 150% elongation (kg./cm.²) | 48 | 54 | 81 | 98 |
| Tear strength by slit test (kg./cm.) | 15 | 14 | 13 | 12 |
| Hardness Shore A (degrees) | 76 | 75 | 75 | 76 |
| Rebound elasticity | 13 | 13 | 11 | 12 |

EXAMPLE III

Two more vulcanizable butyl rubber compositions were prepared with "Durophen 219W" as the vulcanizing agent. However, in this case the readily volatilizable solvent in "Durophen 219W" was replaced, as described in Example I, by a high-boiling-point solvent, which is a mixture of high-molecular aliphatic-aromatic polyesters. The high-boiling-point solution of the bisphenol resin thus obtained is hereinafter referred to as "Resin C." The following table shows the make-up of the two compositions VIII and IX used in this example, the quantities being in parts by weight.

Table V

| Composition | VIII | IX |
|---|---|---|
| Butyl rubber "Enjay 365" | 100.0 | 100.0 |
| MPC carbon black | 60.0 | 60.0 |
| Stearic acid | 1.0 | 1.0 |
| Resin C | 6.0 | 8.0 |
| SnCl₂·2H₂O | 4.0 | 4.0 |

The compounding procedure was the same as that described in Example I. Thereafter, each composition was divided into two equal parts, which were vulcanized at 154° C. for 15 and 30 minutes, respectively. The following table shows the physical properties of the various vulcanizates obtained thereby.

Table VI

| Composition | VIII | | IX | |
|---|---|---|---|---|
| Vulcanization time (min.) | 15 | 30 | 15 | 30 |
| Tensile strength (kg./cm.²) | 119 | 102 | 117 | 106 |
| Ultimate elongation (percent) | 240 | 199 | 224 | 191 |
| Modulus at 150% elongation (kg./cm.²) | 67 | 75 | 74 | 81 |
| Tear strength by slit test (kg./cm.) | 14 | 14 | 13 | 12 |
| Hardness Shore A (degrees) | 75 | 78 | 78 | 79 |
| Rebound elasticity | 11 | 12 | 12 | 12 |

The results tabulated above clearly show that the vulcanizing effect of the bisphenol resin contained in "Durophen 219W" is the same, regardless of whether it is used in conjunction with low-boiling-point or high-boiling-point solvents. The same results were obtained when the bisphenol resin was admixed with a mineral oil, but the bisphenol resin forms merely an emulsion therewith and the mixture is therefore not capable of storage because the phases gradually divide on standing.

EXAMPLE IV

Another vulcanizable butyl rubber composition X was prepared with Resin A as the vulcanizing agent and, this time, FeCl₃·6H₂O was used as the vulcanization accelerator instead of SnCl₂·2H₂O. The following table shows the ingredients of this composition, the amounts being given in parts by weight.

Table VII

Composition X:
Butyl rubber "Enjay 365" _____ 100.0
MPC carbon black _____ 60.0
Stearic acid _____ 1.0
Resin A _____ 8.0
FeCl₃·6H₂O _____ 3.0

The composition was then divided into two equal parts and vulcanized at 154° C. for 30 and 45 minutes, respectively. The following table shows the physical properties of the vulcanizates obtained thereby.

Table VIII

| Composition | X | |
|---|---|---|
| Vulcanization time (min.) | 30 | 45 |
| Tensile strength (kg./cm.$^2$) | 64 | 64 |
| Ultimate elongation (percent) | 489 | 487 |
| Modulus at 150% elongation (kg./cm.$^2$) | 25 | 25 |
| Tear strength by slit test (kg./cm.) | 14 | 13 |
| Hardness Shore A (degrees) | 65 | 66 |
| Rebound elasticity (percent) | 9 | 9 |

EXAMPLE V

To demonstrate that butyl rubber compositions comprising light-colored fillers may also be successfully vulcanized with the aid of bisphenol resins in accordance with the present invention, two vulcanizable compositions XI and XII with silicic acid as the filler were prepared by the procedure of Example I; the quantities of the ingredients being given in parts by weight in the following table:

Table IX

| Composition | XI | XII |
|---|---|---|
| Butyl rubber "Enjay 365" | 100.0 | 100.0 |
| Precipitated pure silicic acid | 45.0 | |
| Silicic acid obtained from gaseous phase | | 45.0 |
| Stearic acid | 1.0 | 1.0 |
| Resin A | 10.0 | 10.0 |
| SnCl$_2$·2H$_2$O | 5.0 | 5.0 |

The compositions were divided into three equal parts each, which were vulcanized for 15, 30 and 45 minutes at 154° C., respectively. The following table shows the physical properties of the various vulcanizates obtained thereby.

Table X

| Composition | XI | | | XII | | |
|---|---|---|---|---|---|---|
| Vulcanization time (min.) | 15 | 30 | 45 | 15 | 30 | 45 |
| Tensile strength (kg./cm.$^2$) | 113 | 110 | 111 | 115 | 116 | 111 |
| Ultimate elongation (percent) | 555 | 523 | 521 | 447 | 436 | 396 |
| Modulus at 150% elongation (kg./cm.$^2$) | 29 | 29 | 29 | 44 | 44 | 46 |
| Modulus at 300% elongation (kg./cm.$^2$) | 56 | 58 | 60 | 77 | 82 | 84 |
| Tear strength by slit test (kg./cm.) | 24 | 23 | 28 | 18 | 20 | 21 |
| Hardness Shore A (degrees) | 59 | 60 | 60 | 70 | 70 | 70 |
| Rebound elasticity (percent) | 10 | 10 | 11 | 12 | 12 | 12 |

EXAMPLE VI

To demonstrate that the successful use of bisphenol resins as vulcanization agents is not confined to butyl rubber, a vulcanizable butadiene-styrene copolymer rubber composition XIII was prepared by the procedure of Example I, the quantities of the ingredients being given in parts by weight in the following table:

Table XI

Composition XIII:
  Butadiene-Styrene copolymer (GRS-1500) __ 100.0
  MPC carbon black _____ 50.0
  Stearic acid _____ 1.0
  Resin A _____ 8.0
  SnCl$_2$·2H$_2$O _____ 4.0

The vulcanizable rubber composition thus obtained was then divided into two equal parts which were vulcanized at 154° C. for 15 and 30 minutes, respectively. The resulting vulcanized products had the physical properties shown in the following table:

Table XII

| Composition | XIII | |
|---|---|---|
| Vulcanization time (min.) | 15 | 30 |
| Tensile strength (kg./cm.$^2$) | 159 | 151 |
| Ultimate elongation (percent) | 302 | 298 |
| Modulus at 150% elongation (kg./cm.$^2$) | 65 | 65 |
| Modulus at 300% elongation (kg./cm.$^2$) | 148 | 150 |
| Tear strength by slit test (kg./cm.) | 22 | 23 |
| Hardness Shore A (degrees) | 76 | 77 |
| Rebound elasticity (percent) | 39 | 39 |

EXAMPLE VII

To demonstrate that butyl rubber compositions vulcanized with bisphenol resins in accordance with the present invention are substantially superior in their ageing characteristics to butyl rubber compositions vulcanized with an alkylphenol resin, three vulcanizable butyl rubber compositions XIV, XV and XVI were prepared by the compounding procedure of Example I, the quantities of the ingredients being given in parts by weight in the following table:

Table XIII

| Composition | XIV | XV | XVI |
|---|---|---|---|
| Butyl rubber "Enjay 365" | 100.0 | 100.0 | 100.0 |
| MPC carbon black | 60.0 | 60.0 | 60.0 |
| Stearic acid | 1.0 | 1.0 | 1.0 |
| Alkylphenol resin | 12.0 | | |
| Resin A | | 8.0 | |
| Resin B | | | 8.0 |
| SnCl$_2$·2H$_2$O | 2.0 | 5.0 | 4.0 |

The alkylphenol resin vulcanizing agent used in composition XIV was prepared by condensing p-octylphenol under alkaline conditions with formaldehyde. The three compositions were then vulcanized at 154° C. for 30 minutes, and each vulcanizate was subsequently aged in a drying chamber with circulating air at 150° C. The physical properties of the three vulcanizates were determined three days after vulcanizing and one week, two weeks and three weeks after ageing. The following table shows the values obtained for each vulcanizate: column A in each case lists the values 3 days after vulcanizing, column B 1 week after ageing, column C 2 weeks after ageing and column D 3 weeks after ageing.

Table XIV

| Composition | XIV | | | | XV | | | | XVI | | | |
|---|---|---|---|---|---|---|---|---|---|---|---|---|
| | A | B | C | D | A | B | C | D | A | B | C | D |
| Tensile strength (kg./cm.$_2$) | 120 | 75 | 49 | 34 | 108 | 88 | 65 | 41 | 106 | 92 | 69 | 52 |
| Ultimate elongation (percent) | 529 | 166 | 128 | 106 | 259 | 215 | 213 | 188 | 209 | 128 | 113 | 103 |
| Modulus at 150% elongation (kg./cm.$_2$) | 19 | 65 | | | 58 | 63 | 48 | 35 | 73 | | | |
| Tear resistance by slit test (kg./cm.) | 25 | 15 | 11 | 10 | 16 | 17 | 15 | 13 | 15 | 16 | 13 | 12 |
| Hardness Shore A (degrees) | 55 | 72 | 71 | 75 | 68 | 75 | 73 | 75 | 76 | 85 | 82 | 81 |
| Rebound elasticity | 4 | 6 | 7 | 7 | 9 | 8 | 9 | 10 | 10 | 12 | 12 | 13 |

The values tabulated above, are, as such, indicative of the improved results obtained by vulcanizing butyl rubber with bisphenol resins rather than with alkylphenol resins. However, the surprising improvements achieved thereby are even more clearly brought out by expressing the characteristic values of the vulcanizates after three weeks of ageing in terms of percent of the corresponding values of the unaged vulcanizates. The following table lists these comparative values:

Table XV

| Composition | XIV | XV | XVI |
|---|---|---|---|
|  | Percent | Percent | Percent |
| Tensile strength | 28.3 | 38 | 49 |
| Ultimate elongation | 20 | 72.6 | 49.3 |
| Tear resistance by slit test | 40 | 81.3 | 80 |
| Hardness | 136 | 110 | 107 |

Thus, the above tabulation shows that while the tensile strength of composition XIV after three weeks of ageing at 150° C. is only 28.3% of the tensile strength after three days of ageing, the tensile strength of composition XV after three weeks of ageing is still 38% of its original value and the tensile strength of composition XVI is still 49% of its original value after three weeks of ageing. Similarly, the values in Table XV clearly show that compositions XV and XVI retain their ultimate elongation, tear resistance and hardness values to a much higher degree during ageing than composition XIV.

Table XVI

| Mixture | XVII | XVIII | XIX | XX |
|---|---|---|---|---|
|  | Parts | Parts | Parts | Parts |
| Butyl rubber | 97.0 | 97.0 | 97.0 | 100.0 |
| $SnCl_2 \cdot 2H_2O$ |  |  |  | 4.0 |
| Chlorosulfonated polyethylene (chlorine content 29%; sulfur content 1.25%) | 3.0 | 3.0 | 3.0 |  |
| Zinc oxide | 0.9 | 1.1 | 0.9 |  |
| EPC-carbon black | 50.0 | 50.0 | 60.0 | 60.0 |
| Stearic acid | 1.0 | 1.0 | 1.0 | 1.0 |
| Unplasticized bisphenol resin dissolved in xylene | 8.0 | 6.0 | 8.0 | 8.0 |

Mixtures XVII to XIX were produced as follows:

The butyl rubber was placed on cooled mixing rolls. After a smooth sheet had been obtained chlorosulfonated polyethylene which had already been rolled before, and then the zinc oxide were added. The stearic acid and carbon black were then incorporated in the mixture and thoroughly worked in by rolling. The mixture was then placed on heated mixing rolls for 10 minutes at a temperature of 195 to 200° C. (measured at the surface of the mixture). The product was then taken from the mixing rolls and allowed to cool down to 80–100° C. At this temperature the resin was incorporated into the mixture on mixing rolls and the product thus obtained was vulcanized at elevated pressure at 155–160° C.

The vulcanized products were placed for one week at 150° C. in a drying chamber through which air was circulated in order to effect ageing. The products had the physical properties shown in Table XVII.

Table XVII

| Mixture | XVII | | XVIII | | XIX | | XX | |
|---|---|---|---|---|---|---|---|---|
|  | Not aged | Aged | Not aged | Aged | Not aged | Aged | Not aged | Aged |
| Vulcanization temperature, °C | 160 | 160 | 160 | 160 | 160 | 160 | 155 | 155 |
| Vulcanization time (min.) | 40 | 60 | 40 | 60 | 40 | 60 | 40 | 40 |
| Tensile strength (kg./cm.²) | 122 | 119 | 109 | 113 | 103 | 123 | 111 | 94 |
| Elongation at break (percent) | 418 | 408 | 450 | 423 | 339 | 317 | 218 | 154 |
| 150% modulus (kg./cm.²) | 34 | 35 | 32 | 32 | 42 | 50 | 71 | 91 |
| 300% modulus (kg./cm.²) | 78 | 79 | 67 | 72 | 90 | 115 |  |  |
| Hardness (Shore Durometer A Scale) | 73 | 73 | 71 | 69 | 77 | 78 | 77 | 83 |
| Rebound elasticity (percent) | 10 | 13 | 9 | 8 | 11 | 11 | 11 | 11 |
| Plasticity of the unvulcanized mixture | 73 | | 74 | | 79 | | 91 | |

EXAMPLE VIII

This example illustrates the vulcanization of mixtures of isobutyleneisoprene copolymers (butyl rubber mixtures) containing carbon black as filler. Small quantities of zinc oxide and chlorosulfonated polyethylene were first incorporated into these mixtures which were then rolled between heated mixing rolls and thereafter vulcanized by means of a non-plasticized bisphenol resin (mixtures XVII to XIX). This resin was obtained by reacting p,p'-dihydroxy-diphenylpropane with 4 moles of formaldehyde in an alkaline medium and subsequent etherification with butanol to such an extent that the resin was soluble in butanol and in benzene and its homologues such as toluene or xylene. The butyl rubber had a 1.5 to 2.0 mol percent unsaturation. The term "mol percent unsaturation" defines the number of diolefine, such as isoprene, units per 100 monomer units in the polymer chain. According to this definition natural rubber has a 100 mol percent unsaturation.

The vulcanization mixtures shown in Table XVI were prepared as described below. For comparison purposes the values of a composition prepared in accordance with Example II by using $SnCl_2 \cdot 2H_2O$ was also prepared (mixture XX).

The mixtures XVII to XIX produced by the process according to the invention show a satisfactory elongation which is only slightly reduced on ageing. Using the steam heated plastometer of the Nederlandsch Optische Fabrieken, plasticity values of 73, 74 and 79 were determined as is usual for mixtures of this type. The plasticity values represent the thickness in hundredths of a millimeter of a sheet of the mixture, originally 1 mm. thick, which has been subjected to a pressure of 10 kg./cm.² for a period of 15 seconds, and a temperature of 100° C.

The elongation of the mixture XX produced according to Example II however, is lower than the elongation of the mixtures XVII to XIX both for the unaged and aged vulcanizates. The plasticity (value 91) shows that the mixture can only be processed with difficulty.

Mixtures with a still lower plasticity (value about 62) could be obtained by adding to any of the mixtures XVII to XIX 5.0 parts of zinc stearate or basic zinc stearate instead of the zinc oxide. In this case the amount of stearic acid was reduced to 0.5 part. Using basic zinc stearate a tensile strength up to 130 kg./cm.² was obtained.

Zinc carbonate or iron stearate may be used instead of zinc oxide or zinc stearate. A mixture similar to mixture XVII, except that one part of iron stearate is used, was prepared, this compound is advantageously applied with a small amount of zinc oxide (0.2 part). The mixture was vulcanized at 160° C. for 60 minutes and had a tensile strength of 124 kg./cm.$^2$ and an elongation of 403%. The plasticity of the unvulcanized mixture was 68.

In the production of the mixtures an annealing step may be substituted for the rolling step between the heated rolls. If mixtures of the compositions XVII to XX were not rolled between heated mixing rolls but 3–6 mm. sheets thereof aged for 50 minutes at 200° C. vulcanization products were obtained after incorporation of the bisphenol resin and vulcanization having substantially the same characteristics as those obtained using the rolling procedure.

EXAMPLE IX

In this example chloroparaffin was employed instead of chlorosulfonated polyethylene as halogen donor. A mixture consisting of 100.0 parts of butyl rubber, 4.0 parts of a semi-liquid chloroparaffin (chlorine content 60%), 1.0 part of zinc oxide, 1.0 part of stearic acid, 50.0 parts of EPC-carbon and 8.0 parts of the non-plasticized bisphenol resin described in Example VIII was produced in the same way as the mixtures XVII to XIX in Example 1. The mixture was vulcanized for 60 minutes at 160° C. and had a tensile strength of 98 kg./cm.$^2$, an elongation of 519% and a hardness of 66° Shore A.

EXAMPLE X

The example illustrates the vulcanization of mixtures of butadiene-acrylonitrile- and butadiene-styrene-copolymers with bisphenol resin.

The mixtures shown in Table XVIII were prepared.

Table XVIII

| Mixture | XXI | XXII | XXIII |
|---|---|---|---|
| | Parts | Parts | Parts |
| Butadiene-acrylonitrilerubber* | 97.0 | | |
| Butadiene-styrene rubber* | | 97.0 | 97.0 |
| Chlorosulfonated polyethylene (29% Cl; 1.25% S) | 3.0 | 3.0 | 3.0 |
| Zinc oxide | 1.1 | 1.4 | 1.4 |
| HAF carbon black | 45.0 | | 50.0 |
| CK$_3$ carbon black | | 50.0 | |
| Stearic acid | 1.0 | 1.5 | 1.5 |
| Unplasticized bisphenol resin produced in the manner described in Example VIII, dissolved in butanol | 8.0 | 8.0 | 8.0 |

*Cold-polymerized, non-decolorising stabilized rubbers.

The mixture were produced in the same way as mixtures XVII to XIX in Example VIII. Before incorporation of the bisphenol resin each mixture was placed for 10 minutes on mixing rolls, mixture XXI at 190–200° C., mixture XXII at 180–197° C., and mixture XXIII at 170–182° C.

Table XIX shows the conditions of vulcanization of the mixtures and the physical properties of the resultant vulcanizates.

Table XIX

| Mixture | XXI | XXII | XXIII | |
|---|---|---|---|---|
| Vulcanization temperature (° C.) | 155 | 155 | 155 | |
| Vulcanization time (minutes) | 20 | 20 | 20 | 40 |
| Tensile strength (kg./cm.$^2$) | 213 | 172 | 192 | 208 |
| Elongation at break (percent) | 354 | 290 | 356 | 210 |
| 150% modulus (kg./cm.$^2$) | 43 | 55 | 47 | 125 |
| 300% modulus (kg./cm.$^2$) | 166 | | 152 | |
| Hardness (Shore Durometer, A Scale) | 64 | 69 | 64 | 75 |
| Rebound elasticity (percent) | 27 | 40 | 39 | 41 |
| Plasticity of unvulcanized mixture | 73 | 75 | 71 | |

Mixtures XXI to XXIII found to vulcanize very rapidly.

Similar results were also obtained by using as vulcanizing agent a plasticized bisphenol resin, e.g. the resin obtained according to Example III of German Patent 605,917 instead of the non-plasticized bisphenol resin. Satisfactory similar results are also obtained when using polyisoprene rubber as the rubber component.

EXAMPLE XI

This example illustrates the use as halogen donor of an unstabilized polyvinyl chloride. As vulcanization agent a non-plasticized bisphenol resin, as described in Example VIII, was used in which the easily volatile solvents were replaced by a mixture of high molecular aliphatic and aromatic esters.

Table XX

| Mixtures XXIV: | Parts |
|---|---|
| Butyl rubber | 100.0 |
| Polyvinyl chloride | 4.0 |
| Zinc stearate | 3.0 |
| EPC carbon black | 60.0 |
| Stearic acid | 1.0 |
| Unplasticized bisphenol resin | 8.0 |

Mixture XXIV described in Table XX was produced as described in Example VIII for mixtures XVII to XIX. Prior to adding the resin the mixture was placed for 5 minutes at 195° C. (measured on the surface of the rolling mixture) on mixing rolls. The mixture was vulcanized at 154° C. for 45 minutes and the vulcanizate had the properties shown in Table XXI.

Table XXI

| | |
|---|---|
| Tensile strength (k./cm.$^2$) | 96 |
| Elongation at break (percent) | 312 |
| 150% modulus (kg./cm.$^2$) | 50 |
| 300% modulus (kg./cm.$^2$) | 92 |
| Hardness (Shore durometer, a scale) | 85 |
| Rebound elasticity | 14 |

EXAMPLE XII

This example illustrates the use of N-bromo-succinimide as halogen donor.

Table XXII

| Mixture | XXV | XXVI | XXVII |
|---|---|---|---|
| | Parts | Parts | Parts |
| Butyl rubber | 100.0 | 100.0 | 100.0 |
| N-bromosuccinimide | 3.2 | 2.5 | 2.5 |
| ZnO | 0.75 | 1.0 | 0.75 |
| HAF-carbon black | 60.0 | | 50.0 |
| EPC carbon black | | 50.0 | |
| Stearic acid | 1.0 | 3.0 | 1.0 |
| Unplasticized bisphenol resin (see Example VIII) | 7.0 | | 7.0 |
| plasticized bisphenol resin (see Example III of German Patent 605,917) | | 8.0 | |

Mixtures XXV to XXVII in Table XXII above were prepared as described in Example VIII for mixtures XVII to XIX. Before the resin was added, mixture XXV was placed for 10 minutes at 175–180° C. on mixing rolls, and mixtures XXVI and XXVII for 10 minutes at 198–202° C.

Table VIII shows the vulcanization conditions and physical properties of the vulcanizates.

Table XXIII

| Mixture | XXV | XXVI | | | XXVII | | |
|---|---|---|---|---|---|---|---|
| Vulcanization temperature (° C.) | 160 | 160 | | | 160 | | |
| Vulcanization time (minutes) | 40 | 20 | 40 | 60 | 20 | 40 | 60 |
| Tensile strength (kg./cm.$^2$) | 117 | 113 | 124 | 123 | 122 | 141 | 142 |
| Elongation at break (percent) | 344 | 481 | 434 | 405 | 435 | 384 | 346 |
| 150% modulus (kg./cm.$^2$) | 33 | 19 | 24 | 26 | 21 | 31 | 36 |
| 300% modulus (kg./cm.$^2$) | 99 | 53 | 71 | 78 | 72 | 104 | 120 |
| Hardness (Shore Durometer, A Scale) | 60 | 58 | 60 | 60 | 55 | 59 | 60 |
| Plasticity of the unvulcanized mixture (percent) | 67 | 73 | | | 74 | | |

EXAMPLES XIII

This example illustrates the use of a bromine donor alone or together with a chlorine donor.

Table XXIV

| Mixture | XXVIII | XXIX |
|---|---|---|
| | Parts | Parts |
| Butyl rubber (see Ex. VIII) | 96.0 | 90.0 |
| Chlorosulfonated polyethylene (chlorine content 29%; sulfur content 1.25%) | 2.0 | |
| Brominated butyl rubber (bromine content about 3%) | 2.0 | 10.0 |
| Zinc oxide | 1.0 | 5.0 |
| Stearic acid | 2.0 | 2.0 |
| Carbon (super abrasion furnace carbon black) | 50.0 | 50.0 |
| Unplasticized bisphenol resin (dissolved in a mixture of butanol and toluene which resin is commercially available under the Trademark Durophen 219 W) | 6.0 | 7.0 |

The mixtures XXVIII and XXIX were prepared in the same manner as described in Example VIII for mixtures XVII to XIX. The mixtures were placed on mixing rolls for 10 minutes at 200° C. before the bisphenol resin was added. The mixtures were vulcanized under the conditions shown in Table XXV and had the physical properties shown therein.

Table XXV

| Mixture | XXVIII | XXIX | |
|---|---|---|---|
| Vulcanization temperature (° C.) | 160 | 160 | |
| Vulcanization time (minutes) | 40 | 60 | 90 |
| Tensile strength (kg./cm.²) | 133 | 87 | 106 |
| Elongation at break (percent) | 437 | 666 | 589 |
| 150% modulus (kg./cm.²) | 35 | 18 | 21 |
| 300% modulus (kg./cm.²) | 84 | 32 | 45 |
| 500% modulus (kg./cm.²) | | 64 | 90 |
| Hardness (Shore Durometer, A Scale) | 75 | 70 | 71 |
| Rebound elasticity | 10 | 8 | 9 |

While I have illustrated the principle of the present invention with the aid of certain specific embodiments thereof, it will be apparent to those skilled in the art that the invention is not limited to these specific examples, and that various changes and modifications may be made without departing from the spirit of the invention or the scope of the appended claims.

What is claimed is:

1. A process for vulcanizing a single type conjugated diene rubber which comprises heating said rubber elastomer with
   (1) a diphenol resin obtained by condensation of a binuclear diphenol with formaldehyde under alkaline conditions and etherification of the resulting polymethylol condensate with a monohydric alcohol and
   (2) a compound selected from the group consisting of (A) halides of metals of groups II and III of the periodic table, (B) halides of heavy metals other than those of groups II and III having a specific gravity greater than 4, and (C) a halogen donor together with a compound selected from the group consisting of oxides and salts of weak acids of said metal which metal compound is reactive with said halogen donor at a temperature in the range from 70 to 250° C.,
and heating the resulting mixture until it is vulcanized.

2. A process as claimed in claim 1, wherein a compound selected from the group consisting of halides, oxides and salts of weak acids of at least one of the metals zinc, aluminum and iron is incorporated into the mixture.

3. A process as claimed in claim 1, wherein the halogen donor and the metal compound are admixed in an amount sufficient for the formation of 0.1 to 10 parts by weight of metal halide per 100 parts of elastomer.

4. A process as claimed in claim 1, wherein 0.1 to 10 parts by weight of the metal halide per 100 parts of elastomer are admixed to the mixture to be vulcanized.

5. The method of claim 1 wherein said diphenol resin is added to the rubber elastomer in the form of a mixture with a plasticizing agent selected from the group consisting of hydroxy fatty acids, containing at least 10 carbon atoms, their glycerides and fatty oils of said fatty acids.

6. A process as claimed in claim 1, wherein the halogen donor is at least one chlorine containing polymer selected from the group consisting of chlorosulfonated polyethylene and polyvinyl chloride.

7. A process as claimed in claim 1, wherein the halogen donor is at least one bromine containing compound selected from the group consisting of brominated butyl rubber and N-bromo-succinimide.

8. The method of claim 1 wherein the diphenol resin is added to the rubber elastomer in the form of a solution in a high-boiling-point liquid which is compatible with the rubber elastomer.

9. The process of claim 1 wherein at least one methylol group is etherified in the diphenol resin.

10. The process of claim 1 wherein about three methylol groups are etherified in the diphenol resin.

11. The process of claim 1 wherein the hydroxyl groups of the binuclear diphenol are in the p,p'-positions.

12. A vulcanizable synthetic rubber composition comprising (1) a rubber elastomer consisting essentially of a single type conjugated diene rubber, (2) a diphenol resin obtained by condensation of a binuclear diphenol with formaldehyde under alkaline conditions and etherification of the resulting polymethylol condensate with a monohydric alcohol and (3) a compound selected from the group consisting of (A) halides of metals of groups II and III of the periodic table, (B) halides of heavy metals other than those of groups II and III having a specific gravity greater than 4, and (C) a halogen donor together with a compound selected from the group consisting of oxides and salts of weak acids of said metal which metal compound is reactive with said halogen donor at a temperature in the range from 70 to 250° C.

13. A process for vulcanizing a rubber elastomer consisting essentially of a single type conjugated diene rubber which comprises heating said rubber elastomer at a temperature from 70° to 250° C. with a halogen donor together with a compound selected from the group consisting of oxides and salts of weak acids of a metal selected from the group consisting of metals of groups II and III of the periodic table and metals other than those of groups II and III having a specific gravity greater than 4 which metal compound is reactive with the halogen donor at temperatures of 70° to 250° C., adding thereto a diphenol resin obtained by condensation of a binuclear diphenol with formaldehyde under alkaline conditions and etherification of the resulting polymethylol condensate with a monohydric alcohol and then heating the mixture until vulcanization is effected.

14. The process of claim 13 wherein the initial heating step is effected at 160 to 210° C.

15. The method of vulcanizing a synthetic rubber selected from the group consisting of rubbery butadiene-styrene copolymers and rubbery copolymers of a major portion of an iso-olefin having from 4 to 7 carbon atoms and a minor portion of a di-olefinic unsaturate having from 4 to 14 carbon atoms, which comprises admixing said synthetic rubber with (1) a bisphenol resin obtained by condensation of p,p'-dihydroxy-diphenylpropane with formaldehyde under alkaline conditions and etherification of the resulting polymethylol condensate with butanol and (2) a metal halide selected from the group consisting of aluminum halides, $SnCl_2 \cdot 2H_2O$, iron chlorides and zinc chloride, and heating the resulting mixture until it is vulcanized.

16. The method of vulcanizing a synthetic rubber as in claim 15, wherein said bisphenol resin is added to the rubber in the form of a mixture with a fatty oil plasticizing agent.

17. The method of vulcanizing a synthetic rubber as in claim 15, wherein the bisphenol resin is added to the rubber in the form of a solution in a high-boiling-point liquid which is compatible with the rubber.

18. The method of vulcanizing a synthetic rubber selected from the group consisting of rubbery butadiene-styrene copolymers and rubbery copolymers of a major portion of an iso-olefin having from 4 to 7 carbon atoms and a minor portion of a di-olefinic unsaturate having from 4 to 14 carbon atoms, which comprises admixing said rubber with (1) a bisphenol resin obtained by condensation of p,p'-dihydroxy-diphenylpropane with formaldehyde under alkaline conditions and etherification of the resulting dimethylol condensate with butanol and (2) stannous chloride, and heating the resulting mixture until it is vulcanized.

19. The method of vulcanizing a synthetic rubber as in claim 18, wherein the bisphenol resin is added to the rubber in the form of a solution in a high-boiling-point liquid which is compatible with the rubber.

20. A vulcanizable synthetic rubber composition comprising (1) a synthetic rubber selected from the group consisting of rubbery butadiene-styrene copolymers and rubbery copolymers of a major portion of an iso-olefin having from 4 to 7 carbon atoms and a minor portion of a di-olefinic unsaturate having from 4 to 14 carbon atoms, (2) a bisphenol resin obtained by condensation of p,p'-dihydroxy-diphenylpropane with formaldehyde under alkaline conditions and etherification of the resulting polymethylol condensate with butanol, and (3) a metal halide selected from the group consisting of aluminum halides, $SnCl_2 \cdot 2H_2O$, iron chlorides and zinc chloride.

21. A vulcanizable synthetic rubber composition comprising (1) a synthetic rubber selected from the group consisting of rubbery butadiene-styrene copolymers and rubbery copolymers of a major portion of an iso-olefin having from 4 to 7 carbon atoms and a minor portion of a di-olefinic unsaturate having from 4 to 14 carbon atoms, (2) a bisphenol resin obtained by condensation of p,p-dihydroxy-diphenylpropane with formaldehyde under alkaline conditions and etherification of the resulting dimethylol condensate with butanol, and (3) stannous chloride.

References Cited by the Examiner
UNITED STATES PATENTS

| | | | |
|---|---|---|---|
| 2,726,224 | 12/1955 | Peterson et al. | 260—41.5 |
| 2,734,039 | 2/1956 | Peterson et al. | 260—19 |
| 2,985,608 | 5/1961 | Higgins et al. | 260—19 |
| 2,999,081 | 9/1961 | Stivers | 260—43 |
| 3,056,754 | 10/1962 | Giller | 260—43 |

LEON J. BERCOVITZ, *Primary Examiner.*

ALPHONSO D. SULLIVAN, *Examiner.*